(12) United States Patent
Wu et al.

(10) Patent No.: US 8,221,891 B2
(45) Date of Patent: Jul. 17, 2012

(54) COATING COMPOSITION AND SURFACE LAYER

(75) Inventors: Jin Wu, Pittsford, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/855,769

(22) Filed: Aug. 13, 2010

(65) Prior Publication Data
US 2012/0041139 A1    Feb. 16, 2012

(51) Int. Cl.
*C08G 73/10* (2006.01)
(52) U.S. Cl. ...................... 428/500; 428/473.5; 428/521; 524/104; 524/113; 524/366; 524/233
(58) Field of Classification Search .................. 524/113, 524/233, 104, 366, 507, 520; 428/473.5, 428/500, 521
See application file for complete search history.

(56) References Cited

U.S. PATENT DOCUMENTS

| 2009/0240003 A1 | 9/2009 | Burns et al. |
| 2010/0149262 A1* | 6/2010 | Lin et al. ................. 347/45 |

FOREIGN PATENT DOCUMENTS

JP    1197518 A    8/1989

OTHER PUBLICATIONS

German Patent Application Serial No. 10 2011 080 261.4, Search Report dated Mar. 7, 2012.

* cited by examiner

*Primary Examiner* — Peter D Mulcahy
(74) *Attorney, Agent, or Firm* — Hoffman Warnick LLC

(57) ABSTRACT

The present teachings provide a composition that includes a functionalized polyfluoropolyether and functionalized polybutadiene in a weight ratio of functionalized polyfluoropolyether/functionalized polybutadiene of from about 20/80 to about 80/20 in a solvent. The composition can be used to form a surface layer having a water contact angle of greater than about 90° and a hexanedecane contact angle greater than about 45°.

10 Claims, No Drawings

COATING COMPOSITION AND SURFACE LAYER

BACKGROUND

1. Field of Use

This disclosure is generally directed to a novel surface layer useful in electrophotographic imaging apparatuses, including digital, image on image, and the like. In addition, the surface coating has application in ink jet print heads and transfer drums.

2. Background

In electrophotographic and ink jet printing certain components require surfaces that are uniform, have a low surface energy and are durable. A surface layer having such properties is useful.

Hydrophobic and oleophobic layers are desirable for toner transfer and cleaning efficiency. Fluorinated polymeric layers typically possess the required hydrophobic characteristics; however, the oleophobic characteristics are not suitable for certain electrophotographic and ink jet printing components. Surface layers that are both hydrophobic and oleophobic are continuously being sought.

SUMMARY

According to an embodiment, there is described a composition that includes a functionalized polyfluoropolyether and functionalized polybutadiene in a weight ratio of functionalized polyfluoropolyether/functionalized polybutadiene of from about 20/80 to about 80/20 in a solvent.

According to another embodiment, there is described a surface layer comprising a crosslinked network of functionalized polyfluoropolyether and functionalized in a weight ratio of functionalized polyfluoropolyether/functionalized polybutadiene of from about 20/80 to about 80/20. The surface layer has a water contact angle of greater than about 90° and a hexanedecane contact angle greater than about 45°.

According to another embodiment there is provided a method of making a surface layer. The method comprises a) adding and reacting functionalized polyfluoropolyether, functionalized polybutadiene, a solvent and a catalyst to provide a coating composition of functionalized polyfluoropolyether and functionalized polybutadiene in a weight ratio of from about 20 to about 80 to about 20 in a solvent. The coating composition is coated on a substrate. The coating composition is cured to form a surface layer.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. –1, –2, –3, –10, –20, –30, etc.

Described herein is a novel hydrophobic and oleophobic coating composition that is useful for a surface layer. The coating composition includes a functionalized polyfluoropolyether (PFPE)/functionalized polybutadiene composite in a weight ratio of from about 20/80 to about 80/20, or from about 25/75 to about 60/40, or from about 30/70 to about 45/55, in a solvent.

In an embodiment, the functionalized PFPE reacts with a functionalized polybutadiene. The reaction can be promoted by using a catalyst. The reaction of the functionalized PFPE with the functionalized polybutadiene under catalysis in a solvent is conducted at from about 100 to about 250° C., or from about 120 to about 200° C., or from about 140 to about 175° C. for a period of from about 10 to about 120 minutes, or from about 20 to about 90 minutes, or from about 30 to about 60 minutes.

The surface layer resulting from the coating composition is a cross-linked network of functionalized polyfluoropolyether and functionalized polybutadiene in a weight ratio of functionalized polyfluoropolyether/functionalized polybutadiene of from about 20/80 to about 80/20, or from about 25/75 to about 60/40, or from about 30/70 to about 45/55. The surface layer has a water contact angle of greater than about 90°, or greater than 100°, or greater than 110° and a hexanedecane contact angle greater than about 45°, or greater than about 55°, or greater than about 65°.

The functionalized polyfluoropolyether (PFPE) is represented by the formula below:

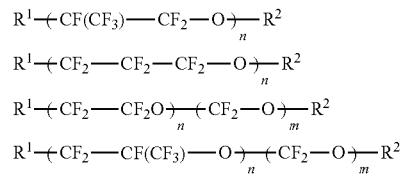

wherein n and m each represent the number of repeating groups, and n is from about 3 to about 120, or from about 10 to about 60; m is from about 5 to about 120, or from about 10 to about 60; and n+m is from about 40 to about 180, or from about 80 to about 125, n/m is from about 0.5 to about 2; $R^1$ and $R^2$ are independently represented by $A^1$-$CF_2O$— and —$CF_2$-$A^2$, respectively, and $A^1$, $A^2$ are independently one of

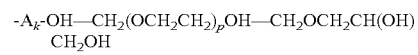

wherein $A_k$ is a bond or an alkylene group with from about 1 to 10 carbon atoms; $R_H$ is H, or an alkyl group with from about 1 to about 10 carbon atoms; and p is from 1 to about 20.

The functionalized PFPE that can be used in the coating composition include hydroxyl terminated PFPE, carboxyl acid or ester terminated PFPE, silane terminated PFPE, or phosphoric acid terminated PFPE, having a weight average molecular weight of from about 100 to about 5,000, or from about 500 to about 2,000, present in an amount of from about 20 to about 80 weight percent, or from about 25 to about 60 weight percent, or from about 30 to about 45 weight percent of the coating composition.

Examples of the hydroxyl terminated PFPE that can be used in the coating composition include FLUOROLINK® D ($M_w$=1,000, functional group —CH$_2$OH and fluorine content~62%), FLUOROLINK® D10-H ($M_w$=700, functional group —CH$_2$OH and fluorine content~61%), FLUOROLINK® D10 ($M_w$=500, functional group —CH$_2$OH and fluorine content~60%), FLUOROLINK® E ($M_w$=1,000, functional group —CH$_2$(OCH$_2$CH$_2$)$_p$OH and fluorine content~58%), FLUOROLINK® E10 ($M_w$=500, functional group —CH$_2$(OCH$_2$CH$_2$)$_p$OH and fluorine content~56%), FLUOROLINK® T ($M_w$=550, functional group —CH$_2$OCH$_2$CH(OH)CH$_2$OH and fluorine content~58%), FLUOROLINK® T10 ($M_w$=330, functional group —CH$_2$OCH$_2$CH(OH)CH$_2$OH and fluorine content~55%) and the like and mixtures thereof, all commercially available from Ausimont USA.

Examples of the carboxyl acid or ester terminated PFPE that can be used in the coating composition include FLUOROLINK® C ($M_w$=1,000, functional group —COOH and fluorine content~61%), FLUOROLINK® L ($M_w$=1,000, functional group —COOR$_H$ and fluorine content~60%), FLUOROLINK® L10 ($M_w$=500, functional group —COOR$_H$ and fluorine content~58%), and the like and mixtures thereof, all commercially available from Ausimont USA.

Examples of the silane terminated PFPE that can be used in the coating composition include FLUOROLINK® S10 ($M_w$=1,750 to 1,950, functional group -A$_k$-Si(OCH$_2$CH$_3$)$_3$), and the like and mixtures thereof, commercially available from Ausimont USA.

Examples of the phosphoric acid terminated PFPE that can be used in the coating composition include FLUOROLINK® F10 ($M_w$=2,400 to 3,100, functional group -A$_k$-OP(O)(OH)$_2$), and the like and mixtures thereof, commercially available from Ausimont USA.

The functionalized polybutadiene (PBD) that can be used in the coating composition include isocyanate PBD, hydroxyl PBD, carboxyl acid or ester PBD, or epoxy PBD, having a weight average molecular weight of from about 200 to about 10,000, or from about 500 to about 5,000, present in an amount of from about 80 to about 20 weight percent, or from about 75 to about 40 weight percent, or from about 70 to about 55 weight percent of the coating composition.

The polybutadiene (PBD) backbone of the functionalized PBD can be poly(1,3-butadiene), poly(1,4-butadiene), hydrogenated poly(1,3-butadiene), hydrogenated poly(1,4-butadiene), and mixtures thereof.

Examples of the isocyanate PBD that can be used in the coating composition include KRASOL® N,N-35, N,N-25, N,N-22, N,N-32, N,N-23, N,N-3A and LBD2000, all commercially available from Sartomer Company, Warrington, Pa.

Examples of the hydroxyl PBD that can be used in the coating composition include KRASOL® HLBH-P2000 (hydroxyl hydrogenated PBD), HLBH-P3000 (hydroxyl hydrogenated PBD), LBH-P2000, LBH-P3000, LBH-P5000, LBH 2000, LBH 3000, LBH 5000, LBH 10000, LBH 2040 (mercaptoethanol PBD), POLY BD® R45HT, R45M, R45HTLO, LFM, R20LM, and R30LM, all commercially available from Sartomer Company, Warrington, Pa.

Examples of the carboxyl or ester PBD that can be used in the coating composition include POLY BD® 45CT, 2000CT, 3000CT, KRASOL® LBM-32 (maleic and umaric acid half-ester PBD), and LBM-22 (maleic and umaric acid half-ester PBD), all commercially available from Sartomer Company, Warrington, Pa.

Examples of the epxoy PBD that can be used in the coating composition include POLY BD® 700, and 700E, both commercially available from Sartomer Company, Warrington, Pa.

The functionalized PFPE can chemically react with the functionalized PBD to form a crosslinked PFPE/PBD composite. For examples, the hydroxyl terminated PFPE reacts with the isocyanate PBD to form the urethane linkages between the PFPE and the PBD; or the hydroxyl terminated PFPE reacts with the carboxyl or ester PBD to form the ester linkages between the PFPE and the PBD; or the hydroxyl terminated PFPE reacts with the epoxy PBD to form the ether linkages between the PFPE and the PBD; or the carboxyl or ester terminated PFPE reacts with the isocyanate PBD to form the carbamate linkages between the PFPE and the PBD; or the carboxyl or ester terminated PFPE reacts with the hydroxyl PBD to form the ester linkages between the PFPE and the PBD; or the carboxyl or ester terminated PFPE reacts with the epoxy PBD to form the ester linkages between the PFPE and the PBD; or the silane terminated PFPE reacts with the hydroxyl PBD to form the silane linkages between the PFPE and the PBD; or the phosphoric acid terminated PFPE reacts with the isocyanate PBD to form the phosphate linkages between the PFPE and the PBD; or the phosphoric acid terminated PFPE reacts with the hydroxyl PBD to form the phosphate linkages between the PFPE and the PBD; or the phosphoric acid terminated PFPE reacts with the epoxy PBD to form the phosphate linkages between the PFPE and the PBD. Among them, the combination of hydroxyl terminated PFPE/isocyanate PBD, carboxyl acid or ester terminated PFPE/hydroxyl PBD or carboxyl acid or phosphoric acid terminated PFPE/isocyanate PBD is preferred.

Suitable catalysts for the composition include organo tin catalysts such as dibutyltin laurate, acid catalysts such as p-toluenesulfonic acid, or base catalysts such as triethylamine, present in an amount of from about 0.01 to about 5 weight percent, or from about 0.1 to about 1 weight percent of the coating composition.

Although most of the above functionalized PFPE and PBD are in liquid form, certain solvents can be added to the coating mixture to facilitate the mixing. Suitable solvents for the coating mixture include N,N-dimethylformamide, N-methylpyrrolidone, tetrahydrofuran, toluene, hexane, cyclohexane, heptane, N,N'-dimethylacetamide, methylene chloride and mixtures thereof, present in an amount of from about 10 to about 90 weight percent, or from about 30 to about 60 weight percent of the coating composition. When coated on substrate followed by subsequent drying, the solvent evaporates and the functionalized PFPE/functionalized PBD crosslinks, resulting in the formation of a crosslinked PFPE/PBD coating composition.

It is theorized that since the fluoro segments (PFPE) and the hydrocarbon segments (polybutadiene) are chemically linked at the ends, macro phase separation is prevented. However, micro phase separation occurs in the coating composite, which results in a hydrophobic and oleophobic coating. As used herein, the term "hydrophobic/hydrophobicity" refers to the wettability behavior of a surface that has, e.g., a water contact angle of approximately 90° or more; and the term "oleophobic/oleophobicity" refers to the wettability behavior of a surface that has, e.g., a hexadecane contact angle of approximately 45° or more.

The coating mixture or solution can be coated on a variety of substrates including metals such as stainless steel, copper, nickel, or aluminum, plastics such as polyesters, or polyimides, rubbers such as silicones, or glass.

The coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

For example, a coating mixture or solution can be prepared by mixing about 34.5 weight percent of an isocyante polybutadiene, about 15 weight percent of a hydroxyl terminated polyfluoropolyether, about 0.5 weight percent of dibutyltin laurate, and about 50 weight percent of tetrahydrofuran together for a period of from about 5 to about 30 minutes. The resulting coating mixture or solution was draw bar coated on a 75 micron polyimide film, and subsequently dried at temperatures of from about 120 to about 200° C. for a period of from about 10 to about 60 minutes. A coating composition of polybutadiene/polyfluoropolyether/dibutyltin laurate=60/30/1 is formed on top of the polyimide substrate with a thickness of from about 1 to about 400 microns.

Specific embodiments will now be described in detail. These examples are intended to be illustrative, and not limited to the materials, conditions, or process parameters set forth in these embodiments. All parts are percentages by solid weight unless otherwise indicated.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

EXAMPLES

Experimentally, the hydroxyl terminated PFPE (Fluorolink® D, Ausimont USA) was mixed with the isocyanate polybutadiene (Krasol® N,N-35, Sartomer) in the weight ratio of 30/70 in tetrahydrofuran (THF). Small amounts of the tin catalyst dibutyltin laurate were added to accelerate the crosslinking reactions between the hydroxyl PFPE and the isocyanate polybutadiene (PBD).

The coating solution was coated on a polyimide substrate via a draw bar coater, and subsequently cured at 150° C. for 30 minutes, and a 10 μm thick composite coating was obtained. The coating possessed a pencil hardness of 1H and was flexible, indicating good mechanical property due to its crosslinking nature.

The composite coating was further tested for contact angles, and the results are shown in Table 1. The data of polytetrafluoroethylene (PTFE) was also included for comparison.

TABLE 1

| | PFPE/PBD = 30/70 composite | PTFE |
|---|---|---|
| Water contact angle | 112° ± 1° | 110° |
| Hexadecane contact angle | 70° ± 1° | 45° |

Compared with PTFE, the disclosed PFPE/PBD composite exhibits comparable water contact angle, which indicates that the disclosed PFPE/PBD composite is as hydrophobic as PTFE. Most importantly, the disclosed PFPWE/PBD composite exhibits about 25° higher hexadecane contact angle, which indicates that the disclosed PFPE/PBD composite is more oleophobic than PTFE. Thus, this disclosure provides a novel composite layer that is both hydrophobic and oleophobic, and which layer is suitable for application in electrophotographic imaging apparatuses, including digital, image on image, and the like as well as in ink jet print heads and transfer drums.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. A composition comprising:
    a coating mixture comprising functionalized polyfluoropolyether and functionalized polybutadiene in a weight ratio of functionalized polyfluoropolyether/functionalized polybutadiene of from about 25/75 to about 60/40 in a solvent.

2. The composition of claim 1 wherein the solvent is selected from the group consisting of N,N-dimethylformamide, N-methylpyrrolidone, tetrahydrofuran, toluene, hexane, cyclohexane, heptane, N,N'-dimethylacetamide, methylene chloride and mixtures thereof.

3. The composition of claim 1 wherein the functionalized polyfluoropolyether is represented by:

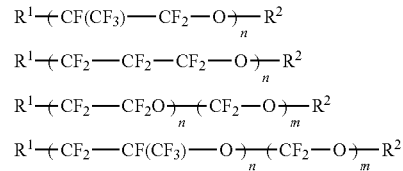

wherein n and m each represent the number of repeating groups; n is from about 3 to about 120;
m is from about 5 to about 120; n+m is from about 40 to about 180, n/m is from about 0.5 to about 2; $R^1$ and $R^2$ are independently represented by $A^1$-$CF_2O$— and —$CF_2$-$A^2$, respectively; $A^1$, $A^2$ are independently one of

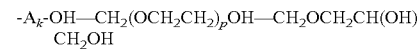

wherein $A_k$ is a bond or an alkylene group with from about 1 to 10 carbon atoms; $R_H$ is H, or an alkyl group with from about 1 to about 10 carbon atoms; and p is from 1 to about 20.

4. The composition of claim 1 wherein the functionalized polyfluoropolyether is one of a hydroxyl terminated polyfluoropolyether, a carboxyl acid terminated polyfluoropolyether, an ester terminated polyfluoropolyether, a silane terminated polyfluoropolyether, or a phosphoric acid terminated polyfluoropolyether.

5. The composition of claim 1 wherein the functionalized polybutadiene comprises an isocyanate polybutadiene, a hydroxyl polybutadiene, a carboxyl acid polybutadiene, an ester polybutadiene, or an epoxy polybutadiene and wherein said polybutadiene is selected from the group consisting of poly(1,3-butadiene), poly(1,4-butadiene), hydrogenated poly(1,3-butadiene), hydrogenated poly(1,4-butadiene), and mixtures thereof.

6. A composition comprising:
a surface layer comprising a crosslinked network of functionalized polyfluoropolyether and functionalized polybutadiene in a weight ratio of functionalized polyfluoropolyether/functionalized polybutadiene of from about 25/75 to about 60/40 wherein the surface layer comprises a water contact angle of greater than about 90° and a hexanedecane contact angle greater than about 45°.

7. The composition of claim 6 wherein the functionalized polyfluoropolyether is represented by:

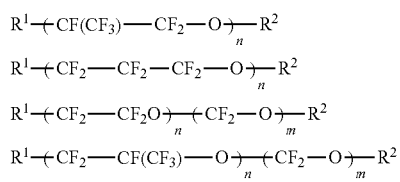

wherein n and m each represent the number of repeating groups; n is from about 3 to about 120;
m is from about 5 to about 120; n+m is from about 40 to about 180, n/m is from about 0.5 to about 2; $R^1$ and $R^2$ are independently represented by $A^1$-$CF_2O$— and —$CF_2$-$A^2$, respectively; $A^1$, $A^2$ are independently one of -$A_k$-OH—$CH_2(OCH_2CH_2)_p$OH—$CH_2OCH_2CH(OH)$$CH_2OH$ —$COOR_H$-$A_k$-$Si(OR_H)_3$-$A_k$-$OP(O)(OH)_2$ wherein $A_k$ is a bond or an alkylene group with from about 1 to 10 carbon atoms; $R_H$ is H, or an alkyl group with from about 1 to about 10 carbon atoms; and p is from 1 to about 20.

8. The composition of claim 6 wherein the functionalized polyfluoropolyether comprises a hydroxyl terminated polyfluoropolyether, a carboxyl acid terminated polyfluoropolyether, an ester terminated polyfluoropolyether, a silane terminated polyfluoropolyether, or a phosphoric acid terminated polyfluoropolyether.

9. The composition of claim 6 wherein the functionalized polybutadiene comprises an isocyanate polybutadiene, a hydroxyl polybutadiene, a carboxyl acid polybutadiene, an ester polybutadiene, or an epoxy polybutadiene; and said polybutadiene is selected from the group consisting of poly(1,3-butadiene), poly(1,4-butadiene), hydrogenated poly(1,3-butadiene), hydrogenated poly(1,4-butadiene), and mixtures thereof.

10. The composition of claim 6 wherein the crosslinked network of functionalized polyfluoropolyether is selected from the group consisting of a hydroxyl terminated polyfluoropolyether/isocyanate polybutadiene, a hydroxyl terminated polyfluoropolyether/ester polybutadiene, a hydroxyl terminated polyfluoropolyether/carboxyl acid polybutadiene, a hydroxyl terminated polyfluoropolyether/epoxy polybutadiene, a carboxyl terminated polyfluoropolyether/isocyanate polybutadiene, an ester terminated polyfluoropolyether/isocyanate polybutadiene, a carboxyl terminated polyfluoropolyether/hydroxyl polybutadiene, an ester terminated polyfluoropolyether/hydroxyl polybutadiene, a carboxyl terminated polyfluoropolyether/epoxy polybutadiene, an ester terminated polyfluoropolyether/epoxy polybutadiene, a silane terminated polyfluoropolyether/hydroxyl polybutadiene, a phosphoric acid terminated polyfluoropolyether/isocyanate polybutadiene, a phosphoric acid terminated polyfluoropolyether/hydroxyl polybutadiene, or a phosphoric acid terminated polyfluoropolyether/epoxy polybutadiene.

* * * * *